United States Patent [19]

Lass

[11] Patent Number: 4,711,563

[45] Date of Patent: Dec. 8, 1987

[54] PORTABLE COLLAPSIBLE DARKROOM

[76] Inventor: Bennett D. Lass, 85 Harman Rd., Edison, N.J. 08837

[21] Appl. No.: 13,439

[22] Filed: Feb. 11, 1987

[51] Int. Cl.[4] .............................................. G03B 27/52

[52] U.S. Cl. ...................................... 355/21; 354/308; 355/27

[58] Field of Search ..................... 355/21, 27; 354/308

[56] References Cited

U.S. PATENT DOCUMENTS

| | | | |
|---|---|---|---|
| 937,309 | 10/1909 | Kelly et al. | 354/308 |
| 1,027,662 | 5/1912 | Macke | 354/308 |
| 1,074,373 | 9/1913 | Masko | 354/308 |
| 3,677,636 | 7/1972 | Stein | 355/21 X |
| 3,811,767 | 5/1974 | Purnell | 355/27 |
| 4,026,649 | 5/1977 | Leonhart et al. | 355/27 |
| 4,053,219 | 10/1977 | Damm et al. | 355/27 |
| 4,222,655 | 9/1980 | Norris | 354/308 |
| 4,529,296 | 7/1985 | Taylor et al. | 355/21 |

FOREIGN PATENT DOCUMENTS

| | | |
|---|---|---|
| 453180 | 6/1913 | France . |
| 625438 | 10/1927 | France . |

*Primary Examiner*—Richard A. Wintercorn
*Attorney, Agent, or Firm*—Parkhurst & Oliff

[57] ABSTRACT

A portable, collapsible darkroom is provided which permits the operator to develop photographic film at virtually any location. Left and right side panels, a back panel, top panel and front door are removably secured to one another to define a light tight enclosure. Sleeved arm ports and a view port are provided on the front door to provide the operator with physical and visual access to the darkroom. A photographic enlarger may be placed within the enclosure and any desirable configuration of the enlarger, film and photosensitive paper may be achieved. The present invention further provides for the separation of film, photosensitive material and other photographic equipment from chemical processing solutions used to complete the processing of a photographic print.

9 Claims, 3 Drawing Figures

PORTABLE COLLAPSIBLE DARKROOM

BACKGROUND OF THE INVENTION

The field of photography enjoys an ever increasing popularity among both amateur and professional photographers. In addition to the wide variety of cameras and other photographic equipment available today, photograhers often seen creative alternatives to conventional photographic techniques. As a result, today's photographers often seek to develop their own film, thereby affording them greater flexiblity and creativity with the quality of their photographic prints.

Traditionally, because various photographic procedures involved in the development of film must be conducted in the absence of light, it has been common for these procedures to be carried out in a large enclosed area from which extraneous light may be excluded. Such traditional darkrooms are generally quite large in order to accommodate the required equipment, chemicals, photosensitive paper, etc., and to afford the operator the space required to operate the equipment. Because these traditional darkrooms are necessarily quite large, and often quite expensive, the use of such a darkroom is often impractical for today's nonprofessional photographer. As a result, those not able to afford the purchase or rent of traditional darkrooms are relegated to having their photographic film developed and processed by conventional means.

Accordingly, there exists a need for an alternative to costly and impractical traditional darkrooms. A viable alternative need be large enough to accommodate a photographic enlarger and afford the operator the space necessary to effectively compose the enlarger, film and photosensitive material into a desired configuration. Thus, a desirable darkroom need be vertically elongated to the extent required to allow space for telescoping action of the enlarger. However, it is also desirable that a darkroom be collapsible and portable to permit the operator to use the darkroom at virtually any location.

Furthermore, traditional darkrooms are meant to contain all materials and equipment necessary to develop and process photographic film. This results in an undesirable risk of contamination of the film and photosensitive material by the chemical processing solutions in the darkroom.

In addition to amateur photographers being resigned to conventional photographic development and processing techniques, professional photographers, under pressure of time deadlines, often must delay processing of film shot during the course of their work until a conventional darkroom can be accessed. The resultant time delays involved in developing the film are often unacceptable to the professional photographer.

To overcome the disadvantages associated with traditional darkrooms, various smaller portable darkrooms have been developed. However, these also suffer from inherent disadvantages that make their use as a substitute for conventional darkrooms undesirable. For example, U.S. Pat. No. 4,222,655 to Norris, patented on Sept. 16, 1980, teaches a portable darkroom assembly. However, the Norris darkroom cannot accommodate an enlarger within the light tight enclosure. Instead, an enlarger is placed outside the Norris assembly and exposing light is transmitted from the enlarger through a small aperture in a rear panel of the assembly. As a result, the operator must compose the photogrpahic film and photosensitive material in a fixed predetermined special relationship with the enlarger, thereby permitting the development of only certain sized photographic prints. In addition, because the various chemical processing solutions used in photography are housed in the Norris assembly, there is a continuous threat of contamination of the film, photosensitive material and other photographic equipment by the chemical solutions in the darkroom.

U.S. Pat. Nos. 3,811,767 to Purnell and 4,026,649 to Leonhart teach portable photographic assemblies, however each of these assemblies require the operator to be enclosed within the portable photographic area. This also increases the risk of contamination and simultaneously decreases portability.

Accordingly, it is an object of the present invention to provide a portable collapsible darkroom which provides the operator the space necessary to house a photographic enlarger as well as the ability to develop photographic film at virtually any location without risking contamination of the film and photosensitive material by chemical processing solutions in the darkroom.

It is a further object of the present invention to provide an apparatus which is easily transportable and which allows the operator access to the inside of a light tight enclosure without requiring the size and expense of traditional darkrooms.

SUMMARY OF THE INVENTION

The present invention comprises a portable collapsible darkroom assembly which permits the operator to develop photographic film at virtually any location. The darkroom of the present invention is large enough to enclose a photographic enlarger while excluding the chemical solutions used in photographic processing. The darkroom of the present invention comprises removably connected panels forming a light tight enclosure when assembled. More specifically, there are provided left and right side panels, a back panel, a top panel and a front door which, when hingedly attached, permits the operator access into the enclosure. A photographic enlarger may be provided inside the enclosure. When assembled, the operator of the present invention may orient the enlarger, film and photosensitive paper in any desired configuration prior to the film being developed. Once the enlarger, film and photosensitive paper are placed in a desired configuration, the front door of the dark room of the present invention is closed to create a light tight environment. Sleeved access ports on the front door of the present invention permit the operator to access the inside of the enclosure during operation without jeopardizing the development process through the entry of extraneous light. In operation, the enlarger is used to project light through the exposed photographic film and onto the photosensitive paper, thereby creating a print of any desired size of the image on the film. After the image has been projected onto the photosensitive paper, the paper may be placed in a light tight photographic processing drum and removed from the light tight environment and subsequently processed outside the darkroom using conventional techniques. As a result, by not using the chemical processing solutions in the darkroom of the present invention, there is no risk of contamination of film, paper or other photographic equipment by the various chemical solutions employed during the processing operation. Accordingly, the present invention permits the operator to develop exposed photographic film at virtually any location while avoiding the risk of contamination of the photographic film or photosensitive paper by the chemical solutions required during photographic processing.

These and other objects of the present invention are achieved by providing an apparatus wherein left and right side panels, a rear panel, a top panel, and a front door are removably secured to one another, thereby forming a darkroom enclosure. A photographic enlarger may be placed within the enclosure and the bottom of the enclosure or the surface upon which the enclosure is positioned serves as the bottom of the enclosure. The front door is hingedly attached to one of the left and right side panels and may be opened to permit an operator of the claimed device to access the inside of the enclosure. During this operation, the operator may place exposed photographic film in corresponding tray assembly of the photographic enlarger and define spacial relationships between the tray assembly of the photographic enlarger, light source and photosensitive paper within the darkroom assembly. Once the desired configuration has been obtained, the front door of the darkroom assembly is closed to create a light tight environment within the enclosure. Subsequent manipulation of the materials and equipment within the enclosure may be done using light tight sleeved hand ports. An optional view port may be covered with a red filter or the like to serve as a safe-light to allow the operator to look into the enclosure without allowing extraneous light to enter the darkroom during black-and-white processing. During color processing, the view point is covered by an opaque cover, permitting no light to enter the darkroom. The enlarger may then be used to transfer the photographic image on the film onto the light sensitive paper. Once developed, the photosensitive paper may be placed in a light tight processing drum and removed from the darkroom assembly and subsequently processed in a conventional manner to obtain the desired photographic print.

BRIEF DESCRIPTION OF THE DRAWINGS

The objects of the present invention will become clear in connection with the description taken in conjunction with the drawings, wherein.

DETAILED DESCRIPTION OF THE PREFERRED EMBODIMENT

Figure 1:
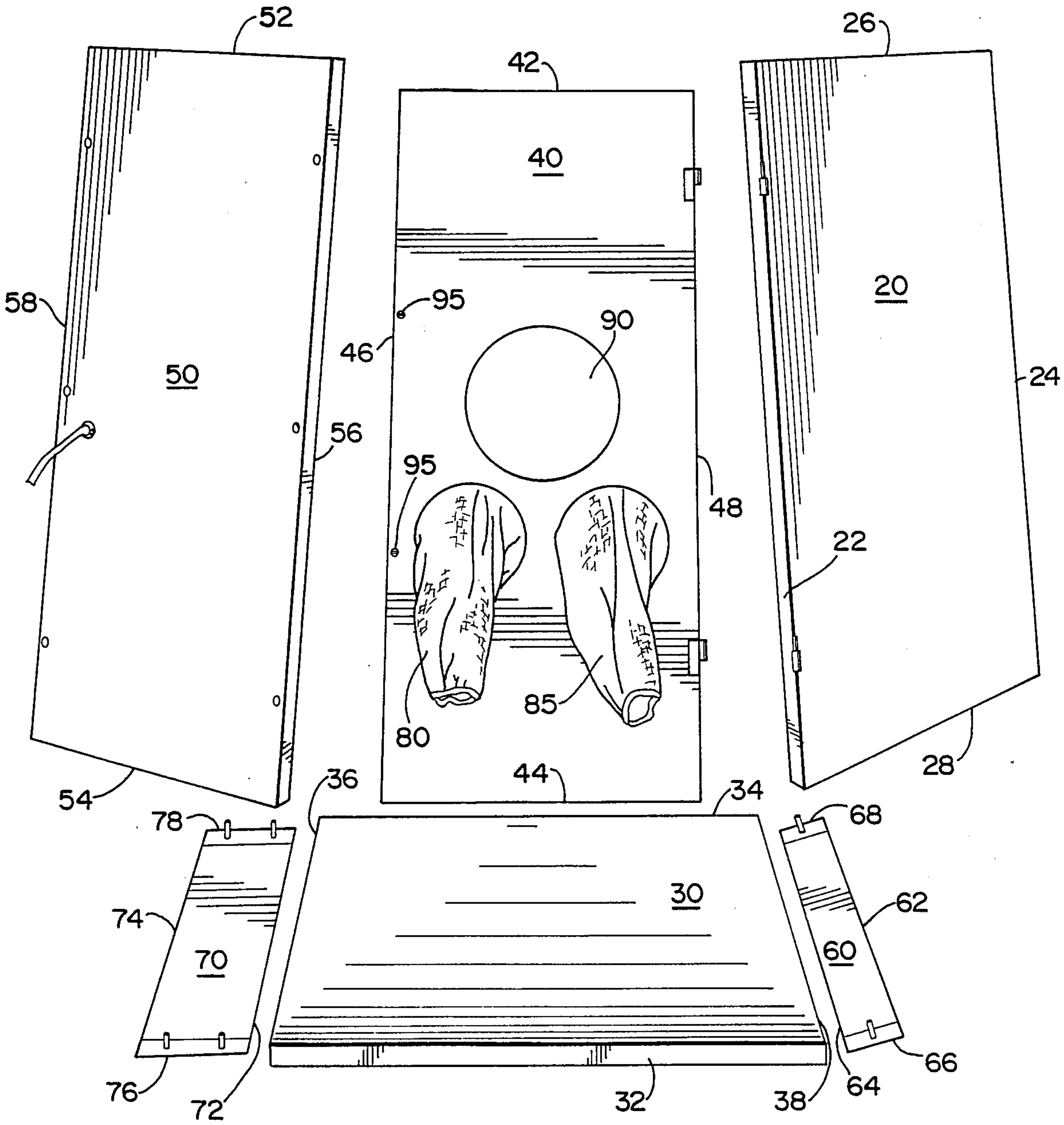
FIG. 1 shows the back panel, right side panel, top panel, first and second front plates and the front door of the darkroom of the present invention in its disassembled state.
Figure 2:
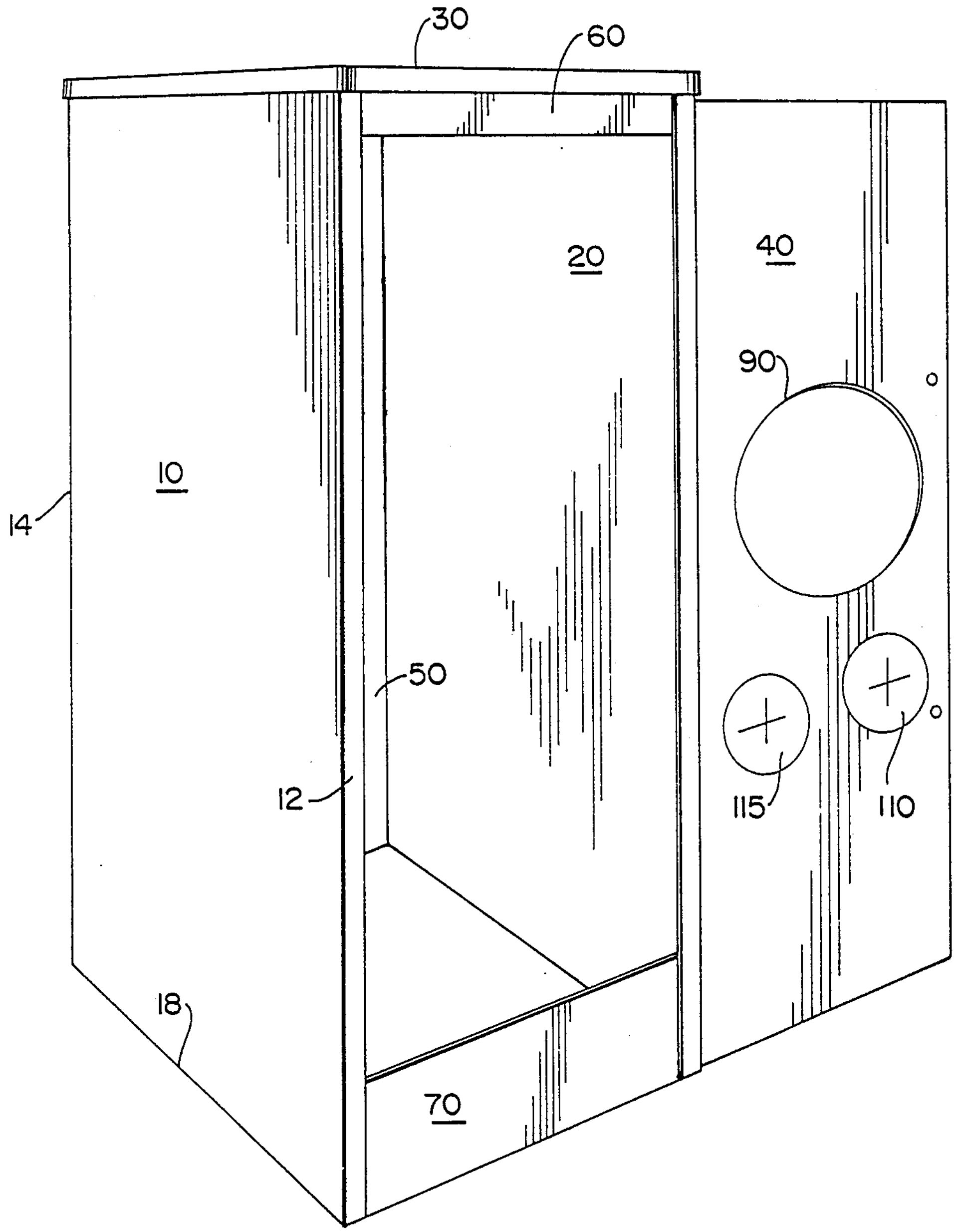
FIG. 2 shows the darkroom of the present invention with the front door open.
Figure 3:
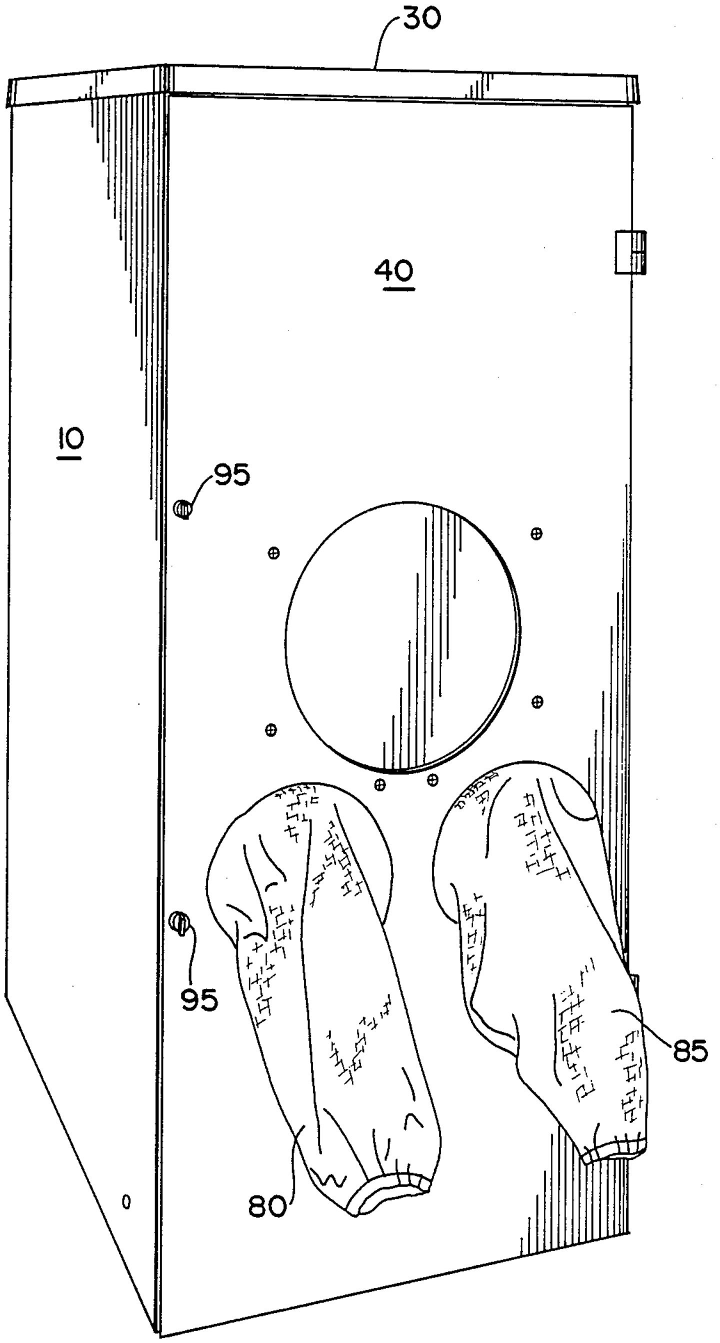
FIG. 3 shows the darkroom of the present invention with the front door closed.

As illustrated in FIGS. 1–3, the darkroom of the present invention comprises a plurality of panels made of metal, plastic or the like which, when assembled, defines a light tight enclosure. In its unassembled state, the individual components of the darkroom assembly can be gathered and easily transported by the operator. Each of the panels of the darkroom assembly is provided with a lip portion around the outer edges thereof. To construct the darkroom assembly, the left and right panels 10, 20 are placed on their respective bottom edges 18, 28 at a predetermined distance equal to the width of the back panel 50. The right edge 58 and left edge 56 of the back panel 50 are removably secured to the rear edges 14, 24 of the left and right panels, respectively. Specifically, pins are provided on lip portions extending from the edges of the left and right side panels. The lip portions overlap the back panel and the pins extend through cooperating holes in the back panel into the enclosure. Clasps or other suitable means engage the pins and thereby secure the panels to one another. The other adjacent panels are secured to each other in a similar manner. The securing of the back panel 50 to the left and right panels 10, 20 defines a three sided rectangular enclosure. Next, the top front panel 60 is attached between the top portions of edges 16, 26 of the left and right panels 10, 20. Similarly, the bottom front panel 70 extends between the bottom of the edges 12, 22 of the left and right panels 10, 20. The top panel 30 is then secured to the left and right panels 10, 20, back panel 50 and top front panel 60. The top front panel 60 extends from the top edges of the left and right panels 10, 20 underneath the lip of the front edge 32 of the top panel 30 for a predetermined distance towards the bottom of the darkroom assembly. Similarly, the bottom front panel 70 extends upward from the bottom edges 18, 28 of the left and right panels 10, 20 for a predetermined distance towards the top of the darkroom assembly. The front door 40 is hingedly attached either to the front edge 12 of the left panel 10 (not shown) or to the front edge 22 of the right panel 20. A latching mechanism 95 is provided to permit the operator to secure the front door to the other of said edges 12, 22, thereby defining a light tight environment within the darkroom assembly. When the front door 40 is secured by means of the latching mechanism 95, the top edge 42 of the front door contacts the top front panel 60 and the bottom edge 44 of the front door 40 contacts the bottom front panel 70. The overlapping of the surfaces ensures that no extraneous light can enter the enclosure.

Provided on the front door 40 of the darkroom assembly of the present invention are first and second sleeved arm ports 80, 85. The arm ports are made of a flexible light tight cloth-like material and attached to first and second holes 100, 105 in the front door of the darkroom assembly. The first and second holes 100, 105 are large enough to permit the arms of the operator to access the inside of the enclosure, thus permitting the operator to manipulate film, paper and other photographic equipment within the darkroom assembly without allowing light to enter the enclosure. The first and second holes 100, 105 are further provided with diaphragms 110, 115 made of rubber or other similar material and provided with X or star shaped slits through which the operator's arms may pass to further ensure that no light enters the enclosure. The arm ports are provided with elastic or other constricting means to ensure a close fit between the arm ports and the arms of the operator. This also ensures that no extraneous light enters the darkroom.

Also provided on the front door 40 of the darkroom assembly is a viewing port 90. During black-and-white photosensitive paper development this viewing port 90 may be provided with a red filter to serve as a safe-light by which the operator may view the inside of the enclosure. Specifically, a channel is provided on the inside surface of the front door surrounding the viewing port on its left, right and bottom sides. When used in the development of black-and-white film, an amber or other suitably colored filter is slid in the channel behind the viewing port. During color photographic processing, a piece of sheet metal or other suitable material through which light may not pass is slid into the channel behind the viewing port to ensure that no extraneous light enters the enclosure.

Lips provided on the bottom edges 18, 28, 54, 74 of the left panel, right panel, back panel and bottom front panel ensure that no light enters the enclosure from underneath the panels. The base of an enlarger provided in the darkroom assembly may rest on the lips to further prevent the entry of light into the enclosure. Optionally, a floor plate may be provided which rests on the lips to prevent light from entering the enclosure.

In operation, the darkroom of the present invention is provided with a photographic enlarger therein. After the operator has taken the desired photographs, the negatives are placed inside the darkroom enclosure. The film is loaded into the enlarger and the desired spacial relationship between the exposing lamp, film and photosensitive paper easel is defined. The darkroom of the present invention is vertically elongated to permit the telescoping action of the enlarger. As a result, any desired spacial relationship between the exposing lamp, film and photosensitive paper can be attained. When the desired spacial composition has been effected, the front door of the darkroom assembly is closed to create a light tight environment within the assembly. After the light tight environment has been created, the operator, using the sleeved hand ports, transfers photosensitive enlarging paper from a protective box to the easel. The paper is then exposed for a predetermined length of time by the enlarger, thereby creating a latent image on the photosensitive paper. After the paper is exposed, it is placed into a photographic tube processor, in which it remains unexposed to light until final processing is performed. Once the photosensitive paper is located within the light tight tube processor, the front door of the darkroom assembly can be opened. Because the chemical solutions required for the subsequent processing are not located within the darkroom assembly, there is no risk of contamination of the film, paper or other photographic equipment. The operator may remove the tube processor to any suitable remote location to perform the subsequent processing on the exposed photosensitive paper.

The embodiments described herein are by way of illustration and not of limitation. Various changes may be made in the construction, composition and arrangement of parts without limitation upon or departure from the spirit and scope of the invention as defined in the appended claims.

What is claimed is:

1. A portable collapsible darkroom assembly for enclosing a photographic enlarger, comprising:

left and right parallel side panels, each having a top, bottom, front and rear edge;

a back panel removably secured to the rear edge of each of said left and right side panels;

a door having a length slightly less than the length of said left and right side panels, said door being removably and hingedly attached to one of said left and right side panels and latchable to the front edge of the other of said left and right side panels for providing access by an operator to the inside of said darkroom assembly;

top and bottom front panels removably attached to top and bottom portions of the front edge of each of said left and right side panels, respectively;

a top panel removably attached to the top edge of each of said left, right, back and top front panels, thereby creating a light-tight enclosure when said door is latched to the front edge of the other of said left and right side panels; and first and second sleeved arm ports provided on said door for providing access by an operator to the inside of the darkroom assembly.

2. A darkroom assembly according to claim 1, further comprising a view port for allowing an operator visual access to said light-tight enclosure.

3. A darkroom assembly according to claim 2, wherein said view port is covered with a filter means for preventing the access of light of certain wavelengths into the light-tight enclosure.

4. A darkroom assembly according to claim 2, wherein said view port is covered with an opaque filter means for preventing the access of all light into the light-tight enclosure.

5. A darkroom assembly according to claim 1, wherein a bottom edge of each of said left side panel, right side panel, back panel and bottom front panel is provided with a lip extending inside the enclosure to prevent light from entering the enclosure.

6. A darkroom assembly according to claim 5, further comprising a floor plate supported by said lips to prevent light from entering the enclosure.

7. A darkroom assembly according to claim 5, wherein the base of an enlarger provided in said darkroom assembly rests on said lips to prevent light from entering the enclosure.

8. A darkroom assembly according to claim 1, further comprising a first and a second diaphragm on said door where each of said first and said second sleeved arm ports contacts said door, said first and said second diaphragms having slits therein through which an operator may access the enclosure.

9. A portable collapsible darkroom assembly for enclosing a photographic enlarger, comprising:

left and right parallel side panels, each having a top, bottom, front and rear edge;

a back panel removably secured to the rear edge of each of said left and right side panels;

a door having a length slightly less than the length of said left and right side panels, said door being removably and hingedly attached to one of said left and right side panels and latchable to the front edge of the other of said left and right side panels for providing access by an operator to the inside of said darkroom assembly;

top and bottom front panels removably attached to top and bottom portions of the front edge of each of said left and right side panels, respectively;

a top panel removably attached to the top edge of each of said left, right, back and top front panels, thereby creating a light-tight enclosure when said door is latched to the front edge of the other of said left and right side panels;

first and second sleeved arm ports provided on said door for providing access by an operator to the inside of the darkroom assembly; and a photographic enlarger operatively connected to said darkroom assembly for exposing a photosensitive material within said assembly.

* * * * *